March 24, 1931.  D. T. OWEN  1,797,787
SPRING STRUCTURE
Filed April 9, 1928
FIG. 1.
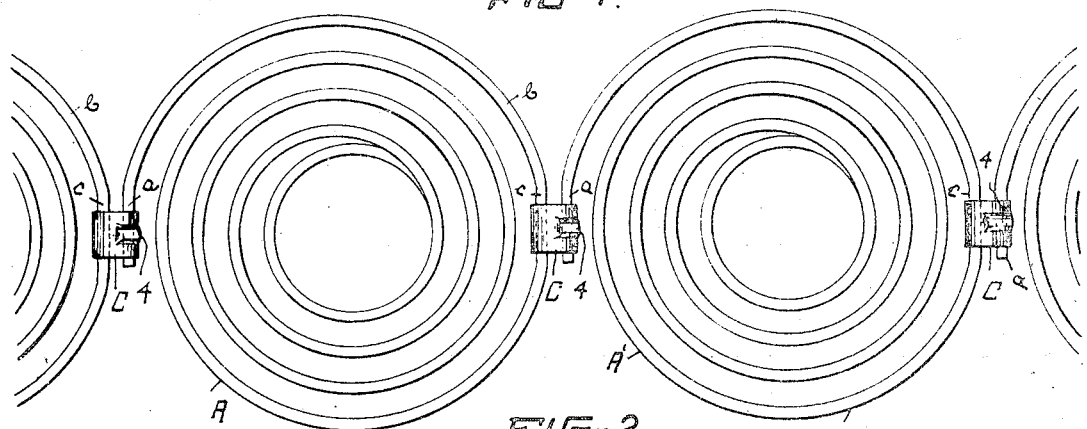
FIG. 2.
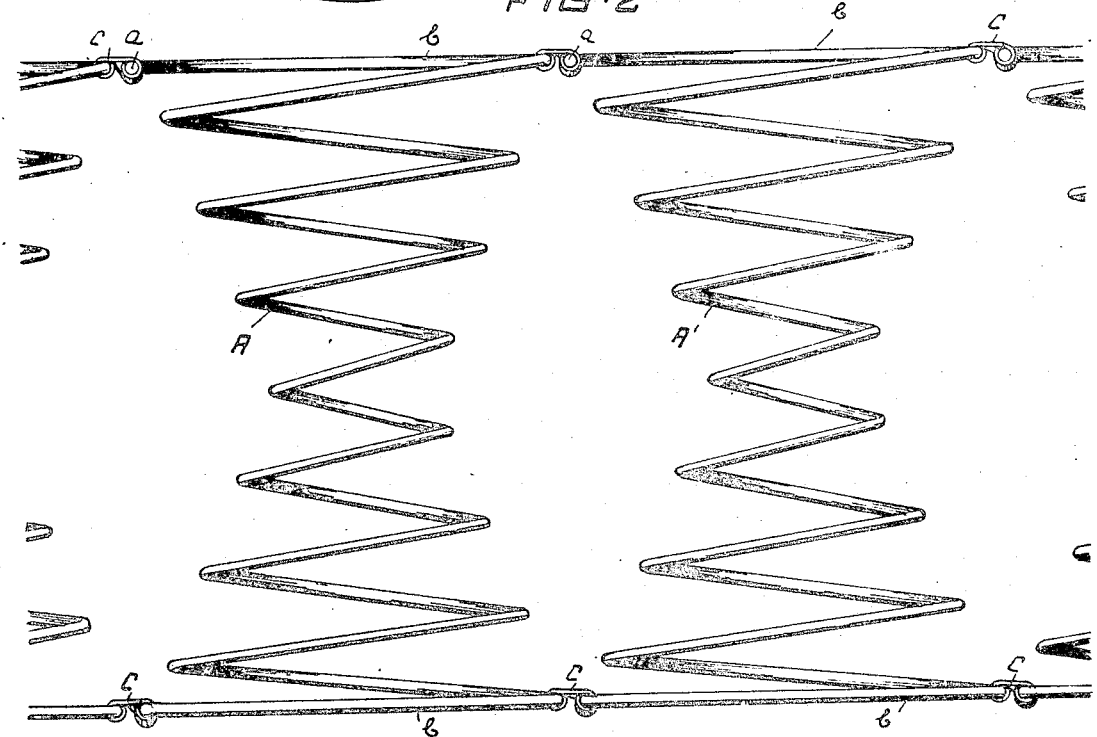
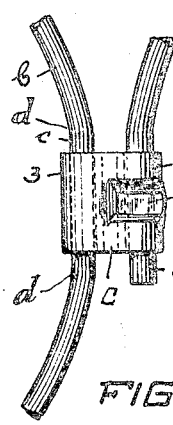
FIG. 3.
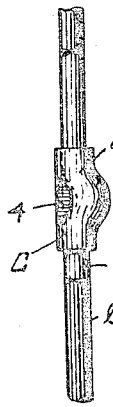
FIG. 4.
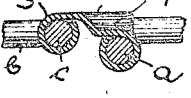
FIG. 5.
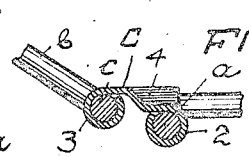
FIG. 6.
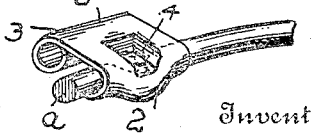
FIG. 7.
Inventor
D. T. OWEN
By Fisher, Moser & Moore
Attorney Patented Mar. 24, 1931

1,797,787

UNITED STATES PATENT OFFICE

DAVID T. OWEN, OF CLEVELAND HEIGHTS, OHIO, ASSIGNOR TO THE OWEN AUTOMATIC SPRING MACHINERY COMPANY, OF CLEVELAND, OHIO, A CORPORATION OF OHIO

SPRING STRUCTURE

Application filed April 9, 1928. Serial No. 268,453.

My invention relates to wire spring structures, and in general my object is to provide a spring mattress, cushion or the like composed of spiral or helical wire springs united together by clips partly hinged and partly rigidly fixed to the springs all as hereinafter shown and described and more particularly pointed out in the claims.

In the accompanying drawings, Fig. 1 is a top view, and Fig. 2 a side elevation of a plural number of helical wire springs clipped together according to my invention. Figs. 3 to 7 inclusive, are enlarged views of the clip and portions of the wire springs where united together: Figs. 3 and 4 being top and side views, Figs. 5 and 6 being sectional views, and Fig. 7 being a perspective view.

My improved spring structure comprises coiled springs —A— made of spring wire of any desired gauge, coiled in the hour glass form delineated in Fig. 2 or fashioned in any other desired way. The terminal portion —a— of each end coil —b— of each spring in the present structure is free and not connected to the body of the spring, thus distinguishing in that respect from the springs commonly used in spring structures and cushions wherein the extremity or terminal portion of the end coil of the spring is tied or fastened in some manner to the body of the same coil to form an endless loop at the base or top of the spring. I prefer to use a free extremity and open coil in each spring —A— to promote free flexing in various directions in the top area of the spring structure. To gain that result and also effect a strong tie or connection between the corresponding end coils of two adjacent springs, I fasten one end 2 of a metal clip C in nonrotatable union to the straight extremity or end portion —a— of the end coil —b— of one spring and hinge the opposite end 3 of this clip to a straight section —c— of the body portion of the corresponding coil or loop —b— in a second spring A'. The clip is made of a flat metal blank of rectangular outline curled at its opposite ends to snugly confine the round wires of the springs, and the curled end 2 of the clip and the wire are jointly indented at 4 to provide a crank-like offset in both the clip and the wire, thereby locking the clip against axial or end movement on the wire while also locking the clip against rotatable movement upon the wire. The clip therefore becomes a rigid immovable part of the wire terminal or extremity —a— of the spring, and it lies in the same horizontal plane as the top of the spring and projects laterally in respect thereto to facilitate its attachment to an intermediate body portion of the corresponding coil or loop in the second spring —A'—. The tie or connection with the second spring is a pivotal or hinged connection, the curled end eye 3 of the clip being curled around the wire to permit rotatable movements relatively between the connected parts. The section —c— of the wire engaged by the clip is straight to permit rotation without bind, and the clip is prevented from shifting longitudinally on straight section —c— by the bends —d— in the circular coil —b—.

When such a spring structure is under load and compressed unevenly, the respective springs act independently with great freedom of movement, the wire of the second spring A' turning freely in clip —C— regardless of the deflected or bent position of the clip itself which corresponds in position at all times to the deflected or bent position of the top coil —b— of spring —A—. The top coil —b— being open at its end or extremity where clip —C— is rigidly affixed thereto the coil —b— will twist or bend readily in different directions, and if the bending or twisting movements are transmitted to the first spring by the second spring through the clip itself the open ended coil of the spring follows that movement and relieves the clip connection of strain. The use of such clips also expedites and reduces the cost of manufacture of such spring structures, as coiled springs with open terminals in the end coils may be produced rapidly and cheaply, and because the springs may be rapidly and securely clipped together by automatic machine operations. The product is also exceptionally resilient, and strong and durable.

What I claim, is:

1. A coil spring unit comprising a plurality of spiral springs arranged in a row, each of the springs, except one at the end of the row, terminating in free flexing extremities, and a clip rigidly connected to each of said extremities and hinged to an adjacent spring in the row.

2. A coil spring unit comprising a plurality of spiral springs arranged in a row, each spring having free flexing extremities, a clip rigidly secured to each of the spring extremities, except two, and hingedly connected to an adjacent spring of the row.

3. A self-contained spring unit comprising a plurality of spiral springs each terminating in free flexing extremities, and a clip connecting each extremity to an adjoining spring, the clip being fixed to said extremity and hinged to said adjoining spring.

In testimony whereof I affix my signature.

DAVID T. OWEN.